US009761850B2

(12) United States Patent
Kristofek et al.

(10) Patent No.: US 9,761,850 B2
(45) Date of Patent: Sep. 12, 2017

(54) MULTI-CELL BATTERY ASSEMBLY

(75) Inventors: Grant W. Kristofek, Wayland, MA (US); Brian D. Hemond, Cambridge, MA (US); Ian W. Hunter, Lincoln, MA (US)

(73) Assignee: Nucleus Scientific, Inc., Cambridge, MA (US)

( * ) Notice: Subject to any disclaimer, the term of this patent is extended or adjusted under 35 U.S.C. 154(b) by 1253 days.

(21) Appl. No.: 13/445,458

(22) Filed: Apr. 12, 2012

(65) Prior Publication Data

US 2013/0108902 A1    May 2, 2013

Related U.S. Application Data

(60) Provisional application No. 61/552,739, filed on Oct. 28, 2011.

(51) Int. Cl.
| | | |
|---|---|---|
| *H01M 10/44* | (2006.01) | |
| *H01M 10/48* | (2006.01) | |

(Continued)

(52) U.S. Cl.
CPC ..... *H01M 2/1077* (2013.01); *H01M 10/0481* (2013.01); *H01M 10/613* (2015.04); *H01M 10/625* (2015.04); *H01M 10/647* (2015.04); *H01M 10/6557* (2015.04); *H01M 10/6567* (2015.04); *B29C 47/0019* (2013.01); *B29C 47/0033* (2013.01); *B29L 2007/002* (2013.01); (Continued)

(58) Field of Classification Search
CPC ........... H01M 2/1077; H01M 10/0481; H01M 10/5004; H01M 10/5016; H01M 10/5032; H01M 10/5075; H01M 10/5059

USPC .................................................. 429/72, 120
See application file for complete search history.

(56) References Cited

U.S. PATENT DOCUMENTS 5,753,384 A    5/1998  Kimberg
6,462,949 B1  10/2002  Parish, IV et al.
(Continued)

FOREIGN PATENT DOCUMENTS

CN   102067354 A   5/2011
DE      1212426 B   3/1966
(Continued)

OTHER PUBLICATIONS

International Search Report issued for PCT/US12/62136, dated Jan. 9, 2013 (2 pages).

(Continued)

*Primary Examiner* — Muhammad Siddiquee
(74) *Attorney, Agent, or Firm* — Wilmer Cutler Pickering Hale and Dorr LLP

(57) ABSTRACT

A battery assembly including: a plurality of prismatic battery cells; first and second fluid manifolds; and a plurality of corrugated flow plates interleaved with the plurality of battery cells, each the flow plates extending from the first manifold to the second manifold and providing an array of flow channels for carrying fluid from the first manifold to the second manifold, wherein each plate of the plurality of corrugated flow plates is an extruded plastic structure comprising first and second fluid impermeable sheets and a plurality of parallel ribs between and connecting the first and second sheets, said plurality of ribs forming the array of flow channels.

18 Claims, 9 Drawing Sheets

(51) Int. Cl.
*H01M 2/10* (2006.01)
*H01M 10/04* (2006.01)
*H01M 10/625* (2014.01)
*H01M 10/647* (2014.01)
*H01M 10/6557* (2014.01)
*H01M 10/6567* (2014.01)
*H01M 10/613* (2014.01)
H01M 10/0525 (2010.01)
B29L 7/00 (2006.01)
B29L 31/00 (2006.01)
B29C 47/00 (2006.01)

(52) U.S. Cl.
CPC .. *B29L 2031/7146* (2013.01); *H01M 10/0525* (2013.01); *Y02E 60/122* (2013.01)

(56) References Cited

U.S. PATENT DOCUMENTS

| | | | |
|---|---|---|---|
| 2001/0032610 A1* | 10/2001 | Karlsson | F01M 11/0004 123/196 AB |
| 2003/0017387 A1 | 1/2003 | Marukawa et al. | |
| 2003/0211384 A1 | 11/2003 | Hamada et al. | |
| 2005/0008950 A1 | 1/2005 | Dulman et al. | |
| 2005/0089750 A1* | 4/2005 | Ng et al. | 429/120 |
| 2006/0008610 A1* | 1/2006 | Hsu et al. | 428/69 |
| 2007/0184341 A1* | 8/2007 | Yoon et al. | 429/152 |
| 2009/0087727 A1* | 4/2009 | Harada | H01M 2/1077 429/120 |
| 2009/0169978 A1 | 7/2009 | Smith et al. | |
| 2009/0325052 A1 | 12/2009 | Koetting et al. | |
| 2009/0325055 A1 | 12/2009 | Koetting et al. | |
| 2010/0000816 A1 | 1/2010 | Okada | |
| 2010/0266883 A1* | 10/2010 | Koetting | H01M 2/1077 429/96 |
| 2011/0027640 A1* | 2/2011 | Gadawski | H01M 2/0212 429/120 |
| 2011/0132580 A1* | 6/2011 | Herrmann et al. | 165/104.33 |
| 2011/0293982 A1* | 12/2011 | Martz et al. | 429/120 |
| 2012/0046116 A1* | 2/2012 | Caldwell | 472/57 |

FOREIGN PATENT DOCUMENTS

| | | |
|---|---|---|
| DE | 102009035482 A1 | 2/2011 |
| EP | 1479127 A2 | 11/2004 |
| GB | 1212426 A | 11/1970 |
| JP | 2000-012071 A | 1/2000 |
| JP | 2003-036830 | 2/2003 |
| JP | 2008-277085 A | 11/2008 |
| JP | 2011-096465 | 5/2011 |
| JP | 2011-100680 A | 5/2011 |
| JP | 2011-525690 A | 9/2011 |
| RU | 2248072 C2 | 3/2005 |
| WO | WO-03/071616 A2 | 8/2003 |
| WO | WO-2011/088997 A1 | 7/2011 |

OTHER PUBLICATIONS

Extended European Search Report issued by the European Patent Office for European Patent Application No. 12844120.1 dated Jun. 1, 2015 (7 pages).

Search Report and Written Opinion issued by the Intellectual Property Office of Singapore for Singapore Patent Application No. 11201401839W mailed Mar. 3, 2015 (15 pgs.).

* cited by examiner

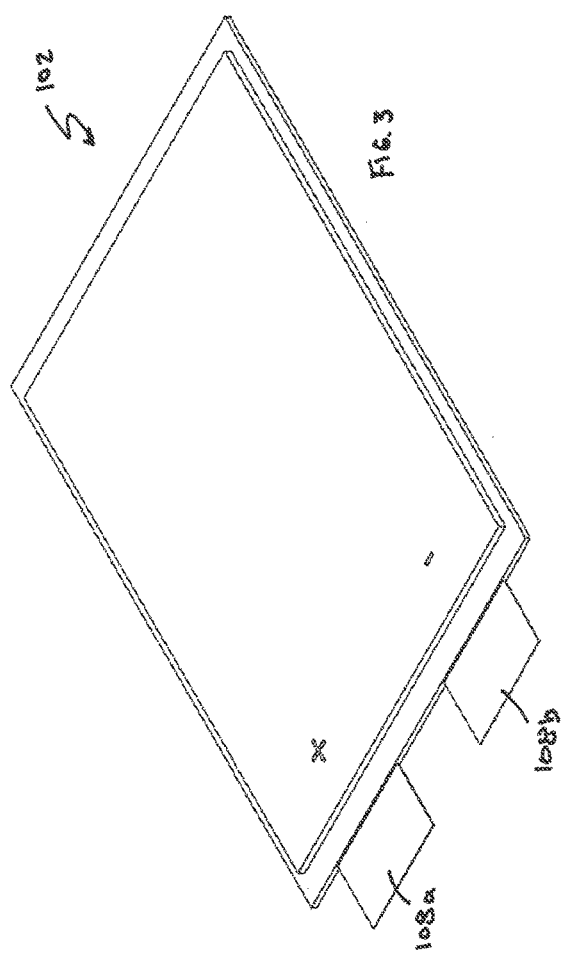
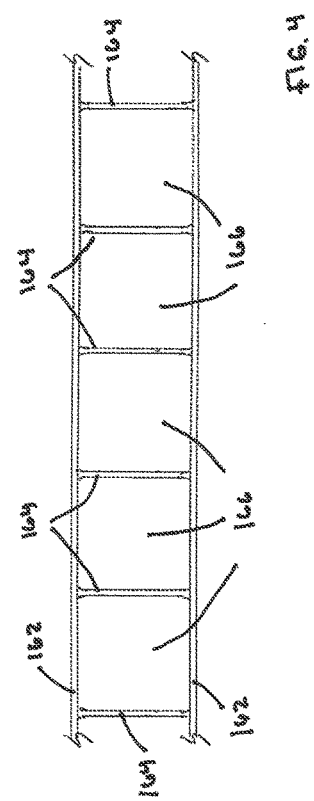

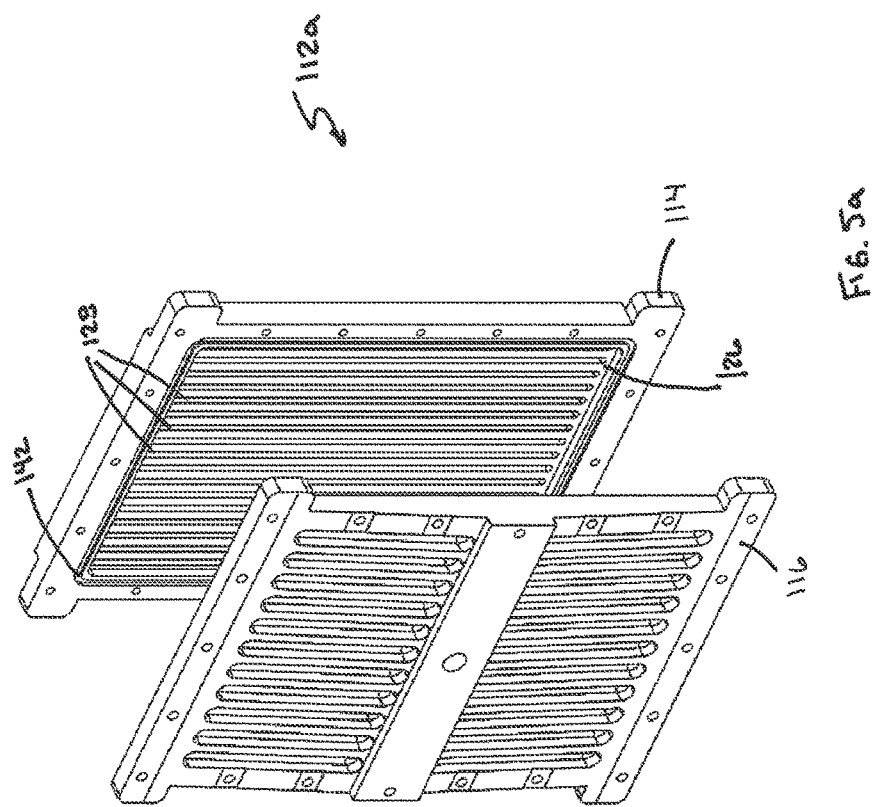

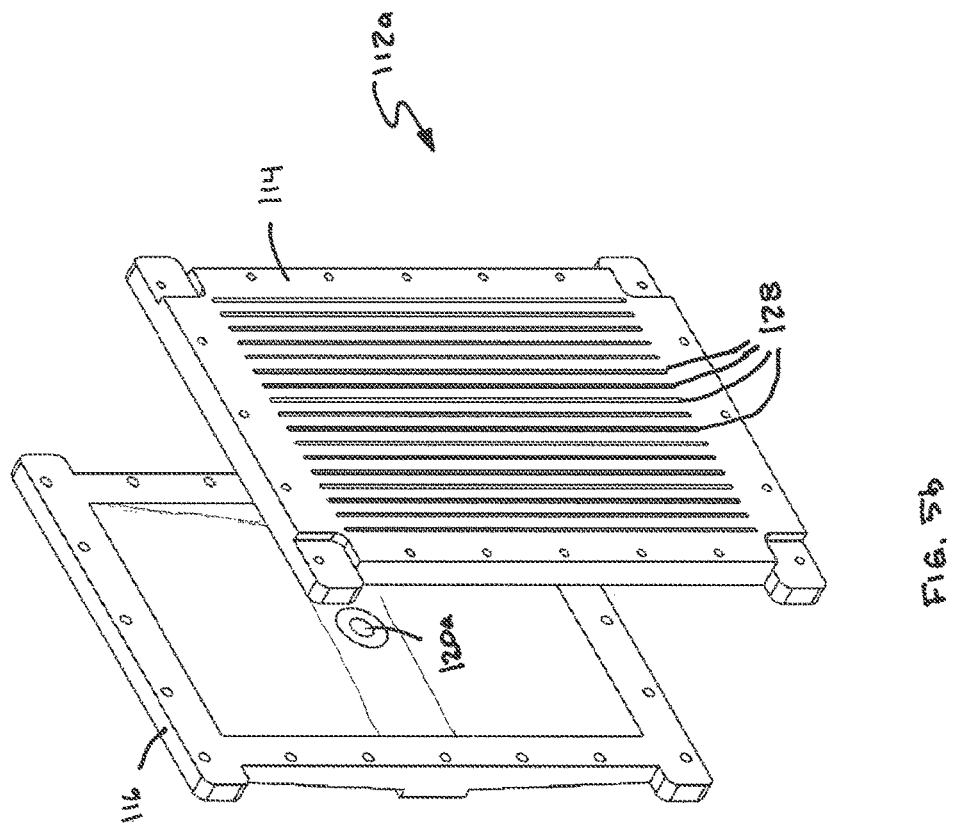

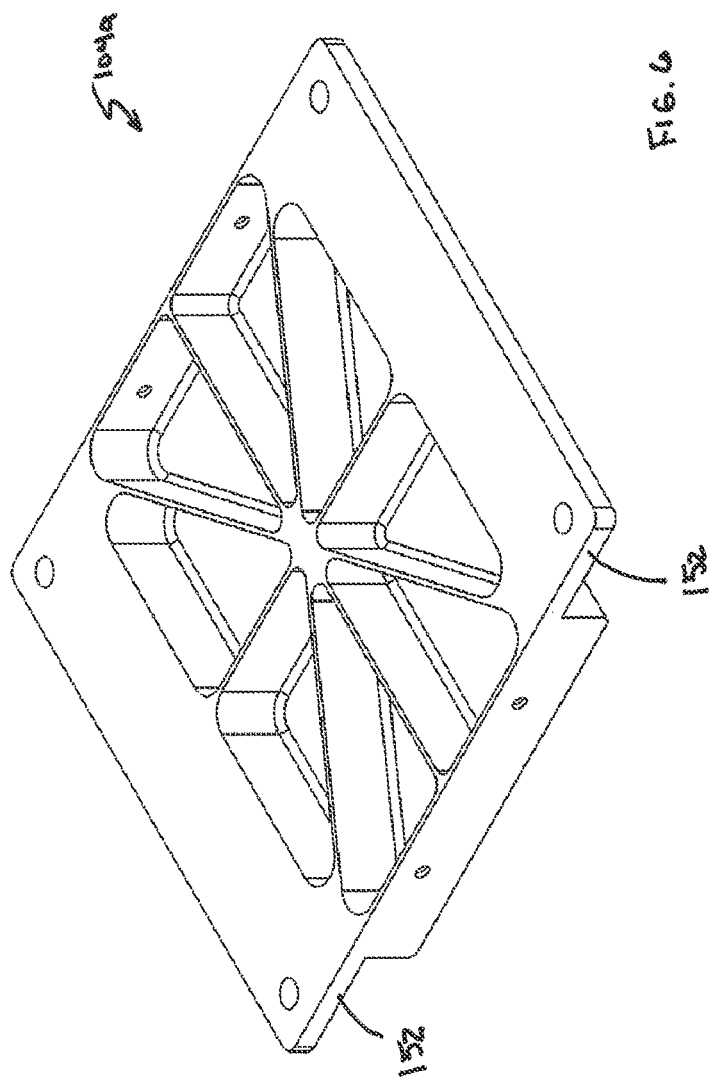

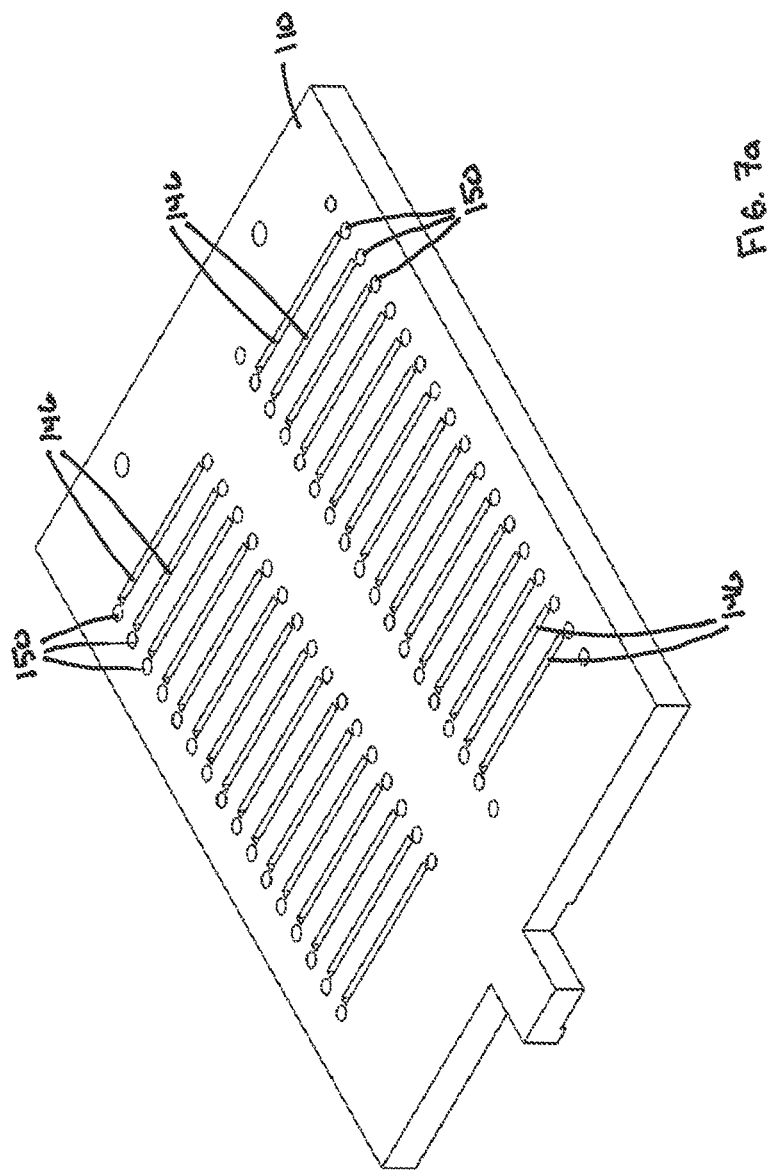

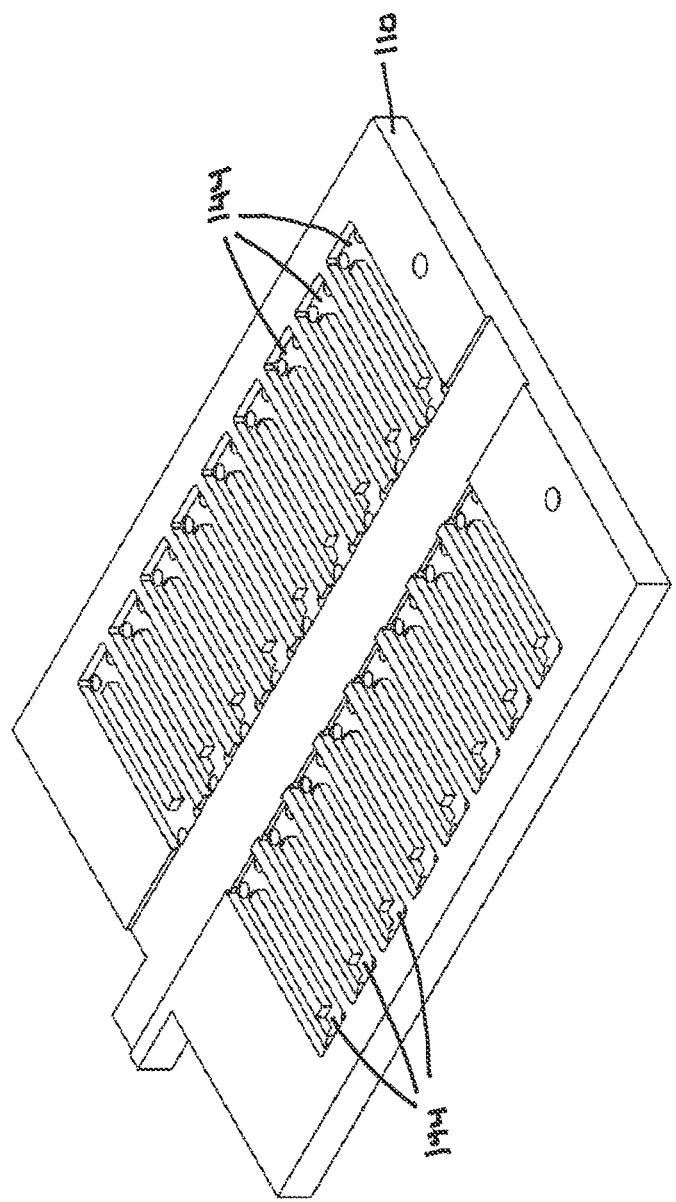

MULTI-CELL BATTERY ASSEMBLY

CROSS-REFERENCE TO RELATED APPLICATION

This application claims the benefit under 35 U.S.C. §119(e) of Provisional Application Ser. No. 61/552,739, filed Oct. 28, 2011, entitled A Multi-Cell Battery Assembly, the entire contents of which are incorporated by reference here.

TECHNICAL FIELD

This invention relates to cooling systems for a multi-cell battery assembly.

BACKGROUND OF THE INVENTION

Rechargeable high performance batteries, such as Li-ion batteries, are widely used today to power electric vehicles. In such environments, the batteries can experience exceptionally high loads as a result of, for example, rapid acceleration or rapid breaking. Such high loads can generate large electrical currents which in turn may result in a significant warming of the Li-ion cells due to their internal resistance. This generation of waste heat and resulting warming cannot be ignored.

In the case of Li-ion batteries, for example, achieving efficient operation requires that they must be operated within a specific temperature range. At operating temperatures greater than about 40° C., the life span of the battery can be significantly reduced. In addition, the temperature gradient among cells in a multi-cell battery must be kept within 5-10 degrees centigrade.

As a consequence, it is essential to have an effective cooling system for such batteries. The cooling system should provide a way to dispose of the waste heat while at the same time assuring that excessive thermal gradients do not occur within the multi-cell battery. It is also desirable that the cooling system be inexpensive and lightweight.

SUMMARY OF THE INVENTION

In general, in one aspect, the invention features a battery assembly including: a plurality of battery cells; a plurality of corrugated flow plates; and first and second fluid manifolds. Each plate of the plurality of corrugated flow plates includes first and second fluid impermeable sheets and a corrugated structure between the first and second sheets. The corrugated structure forms an array of parallel channels extending from one end of that plate to an opposite end of that plate. The plurality of corrugated plates and the plurality of battery cells are interleaved with each other, and each plate of the plurality of corrugated plates extends from the first manifold to the second manifold and is oriented so that the plurality of channels within that plate forms a plurality of fluid flow paths connecting the first and second manifolds.

Other embodiments include one or more of the following features. The battery cells within the plurality of battery cells are lithium-ion batteries. The battery cells within the plurality of battery cells are flat battery cells, e.g. prismatic battery cells. In each corrugated flow plate of the plurality of corrugated flow plates the first and second sheets are made of a plastic material, e.g. a polypropylene polymer. Each corrugated flow plate of the plurality of corrugated flow plates is an extruded structure. In each corrugated flow plate, the corrugated structure is a plurality of ribs between and connecting the first and second sheets. The interleaved arrangement forms a battery cell stack and the assembly also includes a clamping system applying compressive force to the battery cells within the battery cell stack. The battery assembly further includes first and second end plates, the first end plate on one end of the battery cell stack and the second end plate on an opposite end of the battery cell stack. The clamping system includes a plurality of springs exerting forces on at least one of the first and second end plates. Each of the first and second manifolds has an internal cavity and a back wall including a plurality of slots extending into the internal cavity and into each of which is inserted a corresponding one of the plurality of flow plates. Each battery cell among the plurality of battery cells is within direct contact with and between a corresponding two flow plates of the plurality of flow plates.

In general, in another aspect, the invention features a battery assembly including: a plurality of prismatic battery cells; first and second fluid manifolds; and a plurality of corrugated flow plates interleaved with the plurality of battery cells. Each the flow plates extends from the first manifold to the second manifold and provides an array of flow channels for carrying fluid from the first manifold to the second manifold. Each plate of the plurality of corrugated flow plates is an extruded plastic structure having first and second fluid impermeable sheets and a plurality of parallel ribs between and connecting the first and second sheets, wherein the plurality of ribs forms the array of flow channels.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3 illustrates the flat or prismatic battery cell used in the battery pack of FIG. 1.

FIG. 4 shows a side view of a portion of the corrugated flow plate used in the battery pack of FIG. 1.

FIGS. 5a-b show front and back views, respectively, of the cover plate and back plate which make up the manifold from the battery pack of FIG. 1.

FIG. 6 shows the end plate from the battery pack of FIG. 1.

FIGS. 7a-b show bottom and top views, respectively, of the wedge bus bar plate from the battery pack of FIG. 1.

DETAILED DESCRIPTION

Figure 1:
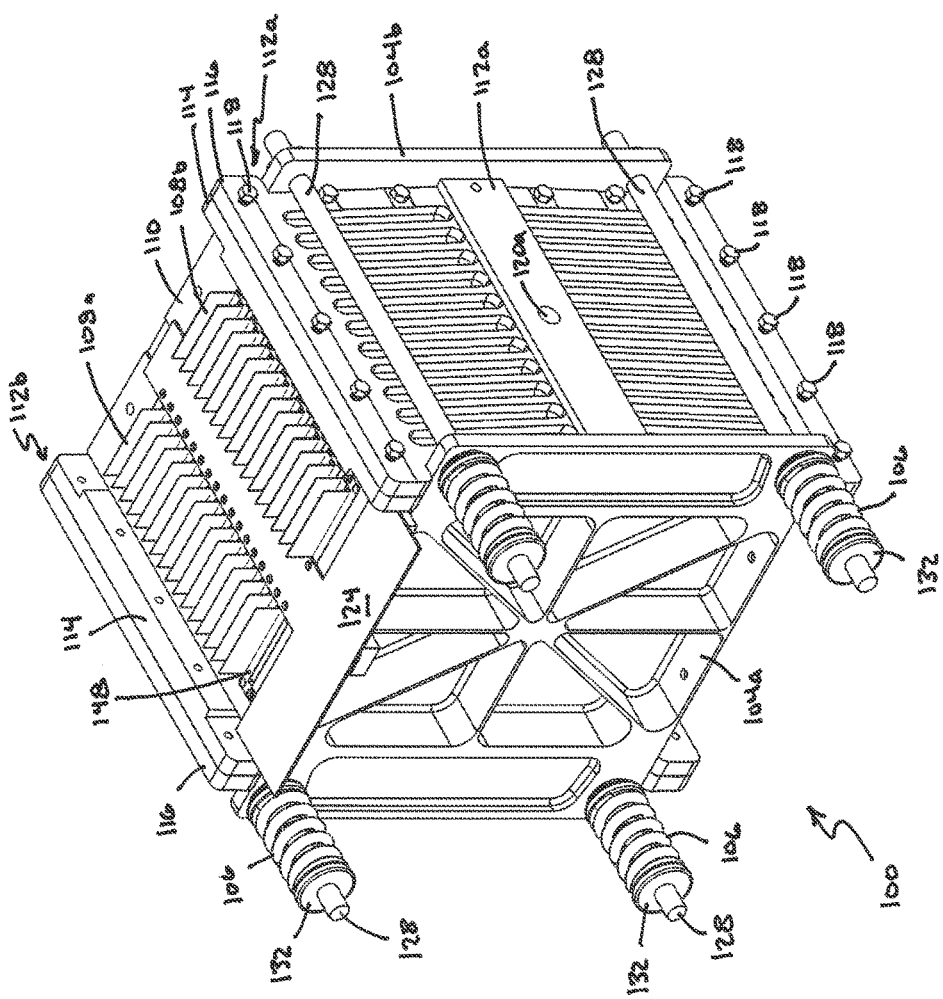
FIG. 1 presents an auxiliary view of a liquid-cooled multi-cell battery pack assembly.
Figure 2:
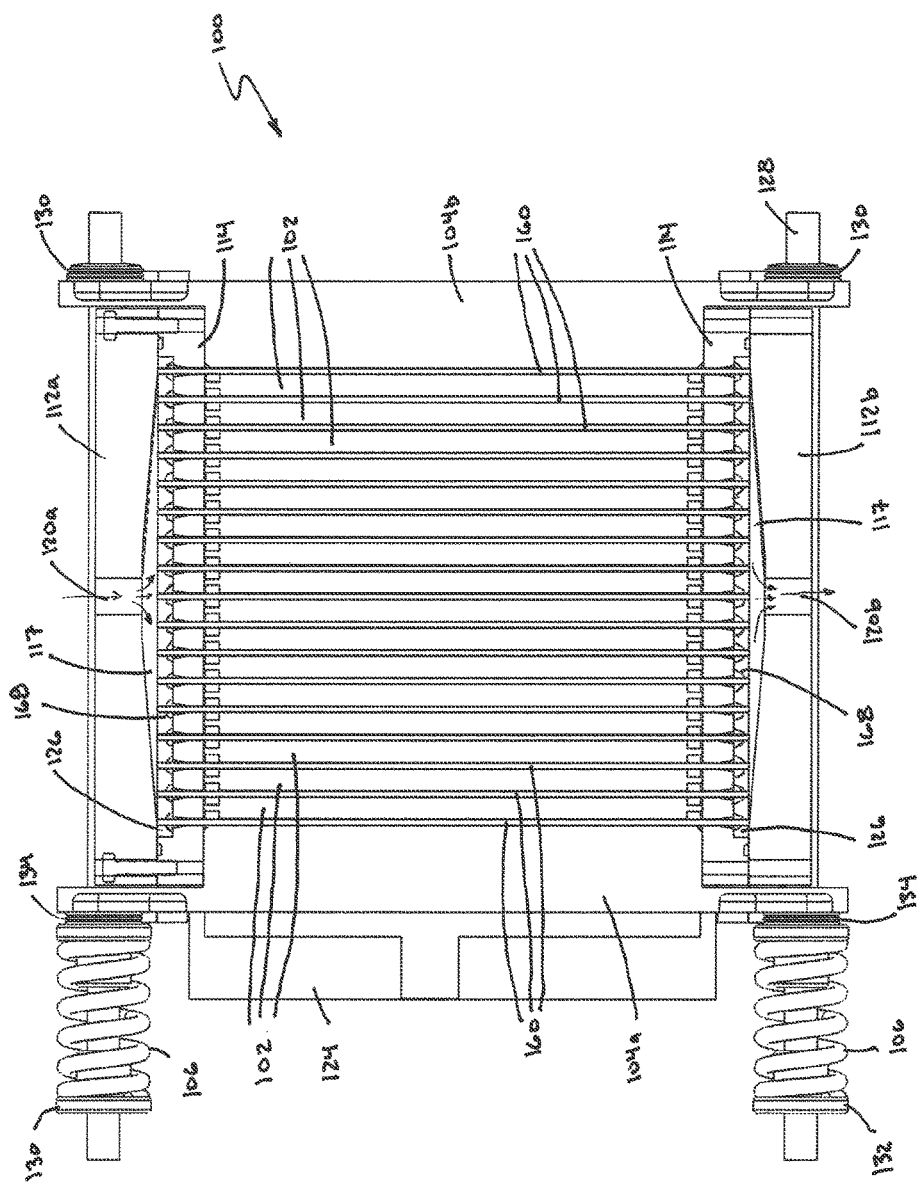
FIG. 2 is a cross-sectional view of the battery pack assembly shown in FIG. 1.

Referring to FIGS. 1 and 2, the described embodiment is a liquid-cooled multi-cell battery pack assembly 100. It includes a stack of 16 rechargeable lithium-ion battery cells 102 (see FIG. 2) clamped together by two rectangular-shaped end plates 104a and 104b that are under compressive forces supplied by four springs 106. End plates 104a and 104b, which have holes in each of their four corners, are mounted on four rods 128, with each rod 128 passing through a corresponding hole in each of the two end plates 104a and 104b. On one end of each rod 128 there is a retaining ring 130 (see FIG. 2) that prevents that rod from sliding out of the hole in the end plate. On the other end of each rod, there is an adjustment mechanism 132 affixed onto the rod, with one of the springs mounted on rod 128 between end plate 104a/b and adjustment mechanism 132. The position of adjustment mechanism 132 can be varied by turning it in one direction to compress spring 106 or the other to allow spring 106 to relax. On each rod 128, there is also a thrust needle roller bearing assembly 134 between the spring and the end plate. Springs 106, which are held in a compressed state by the adjustment mechanism 132, apply a force on end plate 104a thereby causing the end plate to press against and apply pressure on the stack of battery cells. By adjusting the position of adjustment mechanism 132, one can adjust the compressive force that is applied to the battery cells. Bearing assembly 134 helps achieve a smoother and more accurate adjustment of the compression force.

Battery cells 102 are contained within the assembly shown in FIG. 1. Note that in this figure only their positive and negative terminals 108a and 108b which extend through a wedge bus bar plate 110 are visible. Bus bar plate 110 holds the bus bar clamps (to be described later) which make up the bus that electrically interconnects the terminals of the cells. The coolant system for the assembly includes two manifolds 112a and 112b located on opposite sides of the stack of battery cells 102. Each manifold 112a and 112b includes a cover plate 114 and a back plate 116 secured together by two rows of bolts 118. Coolant introduced into manifold 112a through an input port 120a flows between and cools the battery cells in the assembly and is collected on the other side by manifold 112b which has a corresponding exit port 120b (not shown). Battery pack assembly 100 also includes a circuit board 124 mounted on bus bar plate 110 that includes sensing and control circuitry that such as is commonly used to manage the charging, discharging, and balancing of the lithium ion cells during use.

FIG. 3 shows one of the battery cells that is contained within the battery pack assembly. It is also commonly referred to as a prismatic cell. It is a laminated polymer pouch with a flat, thin geometry. Two terminals 108a (the positive terminal) and 108b (the negative terminal) extend out of the edge of one end the pouch. Prismatic cells are commercially available from multiple sources. The cell described herein is available from A123. It has an output voltage of nominally 3.3 volts, a capacity of 14-20 Ah, and for operation requires an applied compressive pressure of about 5-7 PSI.

Referring to FIG. 2, the internal structure of battery pack assembly is shown in cross-section. In manifolds 112a and 112b, cover plate 116 and back plate 114 define an internal chamber 117 for receiving the coolant that flows through the battery pack. Referring to FIGS. 5a-b, the inside surface of cover plate 116 is recessed with the surface tapering at a constant gradient from an outer location in toward the inlet/exit port 120a/b. Back plate 114 also includes a recessed region 126 on the side that faces cover plate 116 when manifold 112a is assembled. On the wall within recessed region 126 there is an array of equally-spaced slots 128 through back plate 114. Extending between the two manifolds 112 is an array of corrugated flow plates 160 for carrying coolant between the battery cells from one manifold 112a to the other manifold 112b.

Referring to FIG. 4, corrugated flow plate 160 has two liquid impermeable side sheets 162 separated from each other by an array of equally spaced, parallel ribs 164 connecting one sheet to the other sheet. The array of ribs forms an array of parallel channels 166 extending in one direction inside of the flow plate and through which coolant is flowed. In addition, ribs 164 provide significant strength preventing the flow sheet from collapsing when put under compressive forces. In the described embodiment, the corrugated flow plates are commercially available Coroplast™ sheets that are made of an extruded polypropylene polymer having a thickness of about 2 mm. Other thicknesses are commercially available, e.g. 2-10 mm.

Referring to FIGS. 2, 5a and 5b, flow plates 160 fit into slots 128 in back plates 114 of the two manifolds 112, with a flow plate 160 arranged in each slot 128. Slots 128 are sized so that the flow plates fit snuggly into them. Flow plates 160 are oriented so that channels 126 within flow plates 160 extend from one manifold to the other. Flow plates 160 pass through the slots 128 in the back plates 114 and extend into cavity 117 defined within manifold 112. On the inside of manifold 112, there is an epoxy seal 168 along slot 128 between flow plate 130 and back plate 114 that prevents coolant from leaking into the regions inside of the battery assembly where it would contact the cells. Each slot 128 has a tapered entrance on the side that is within the manifold and another smaller tapered entrance (not visible in the figures) on the opposite side. The smaller taper makes insertion of flow plate 160 into slots 128 during assembly easier. The larger taper on the inside facilitates a better seal between flow plate 160 and back plate 114 when epoxy is applied by drawing the epoxy into the tapered area and providing a larger surface area for forming the seal.

The sloped upper wall of internal chamber 117 that is formed by the inside surface of cover plate 116 serves to reduce or prevent the Coanda Effect, which could result in some of the many flow channels within the flow plates not supporting a flow and containing stagnant fluid/coolant.

The separations between the flow plates provide spaces into which the battery cells are inserted during assembly. The distances between the flow plates are selected so as to provide a snug fit for the battery cells. This is important so that the compressive forces provide by the end plates will be effectively distributed throughout the stack of battery cells and all battery cells cells will be under sufficient pressure when the battery pack is fully assembled and the springs are adjusted appropriately.

On the inside of back plate 116 there is a channel 142 formed around the perimeter of back plate 116. This channel 142 receives a flexible o-ring (not shown) which forms a seal when cover plate 114 is bolted onto back plate 116.

As indicated in FIGS. 1 and 6, end plates 104a and 104b have ribbed structures. This is to reduce the weight of the end plates while still giving them sufficient rigidity. It is generally desirable to keep the weight of the overall assembly as low as possible and the ribbed end plates provide one way of achieving that objective. As can be observed from FIG. 1, manifolds 112 are designed with a similar objective in mind. Material has been milled out to form an array of recesses in cover plate 114.

Figure 8:
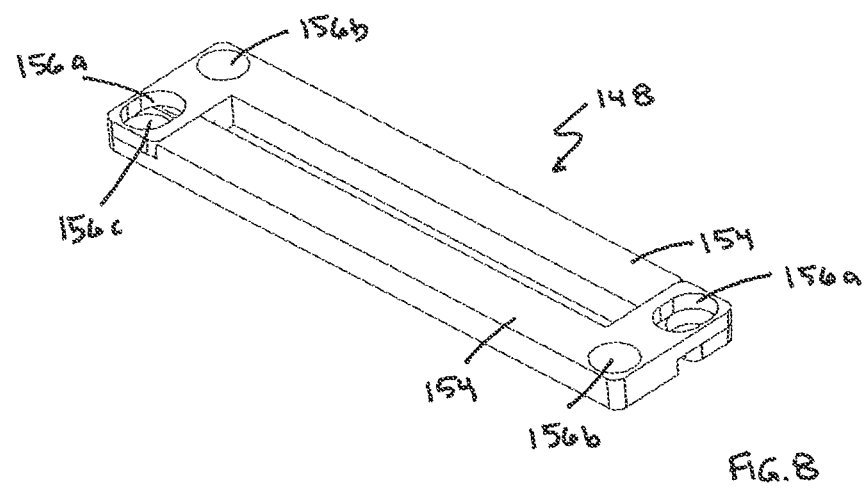
FIG. 8 shows the bus bar terminal clamp from the battery pack of FIG. 1.
Figure 9:
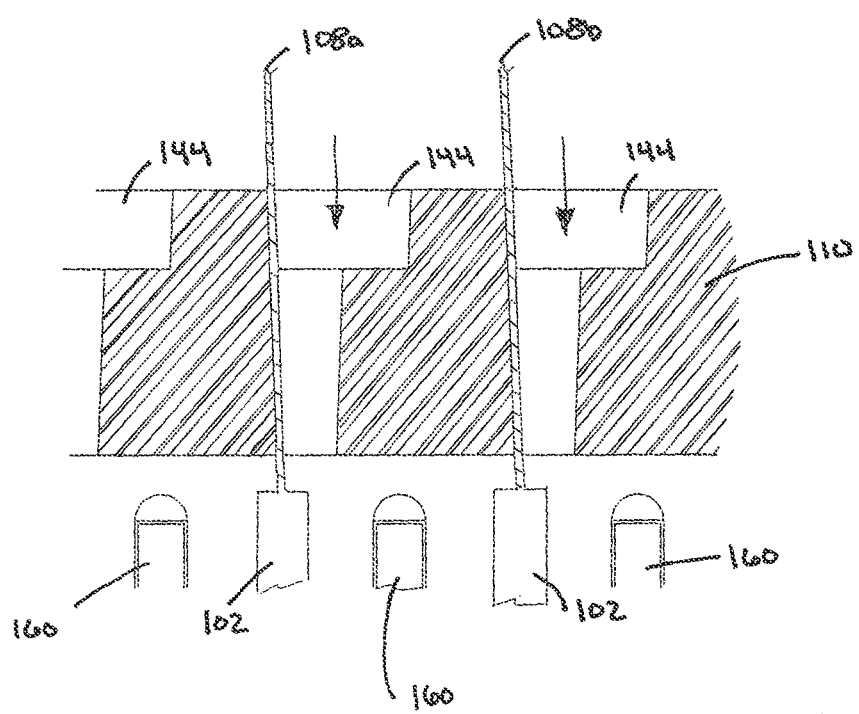
FIG. 9 shows a cross-sectional view of the portion of the wedge bus bar plate with terminals extending through the terminal slots.

Wedge bus bar plate 110, which is shown more clearly in FIGS. 7a-b, has two columns of equally spaced terminal slots 146. Each terminal slot 146 is for a corresponding terminal of a battery cell 102 within the stack of battery cells. When bus bar plate 110 is assembled onto the array of battery cells 102, the terminals pass through their corresponding terminal slots 146 in bus bar plate 110 and extend above bus plate 110 where electrical connections can be made to them. On the front side of bus plate 110 (see FIG. 7b), there is a recessed region 144 surrounding each pair of terminal slots in each column of terminal slots. In the described embodiment which has 16 battery cells, there is one column of eight recessed regions 144 and a second column of nine recessed regions 144. These recessed regions 144 are shaped to receive bus bar terminal clamps 148, an example of which is depicted in FIG. 8. As is more apparent in FIG. 9, the side walls of the recessed regions 144 are slightly tapered inward so the recess becomes narrower as one goes deeper into the recessed region. On the backside of bus bar plate 110 (see FIG. 7*a*), there are threaded inserts 150 located within holes arranged on each end of a terminal slot 146.

Referring to FIG. 8, bus bar terminal clamps 148 are made up of two identical L-shaped metal (e.g. copper) parts 154. In each part there are three holes 156*a-c*. When the parts are assembled onto each other as indicated, holes 156*a* and 156 align with each other. The assembled bus bar terminal clamp 148 has four holes which align with threaded inserts 150 when bus bar terminal clamp 148 is placed into a recessed region 144. The assembled clamps are then secured within the recessed regions by bolts (not shown) which screw into the threaded inserts. through the four holes Battery cells 102 are arranged within the assembly in an alternating orientations, i.e., back-to-back, front-to-front. By alternating the cells, if the first cell will has its positive terminal on the right, then second cell (i.e., the second cell in the stack) will have its negative terminal on the right, the third cell will have its positive terminal on the right, etc.

Thus, when a bus bar terminal clamp 148 is placed into a corresponding recessed region 144 in bus bar plate 110, it electrically connects a negative terminal of one battery cell with a positive terminal of a neighboring battery cell. In this way, the set of seventeen bus bar terminal clamps electrically connect the cells in series so that the total output voltage of a battery assembly with N cells is N times the voltage of an individual cell (e.g. 3.3·N volts).

When bus bar terminal clamp 148 is inserted into its recessed region 144 with the two terminals present, the terminals 108*a* and 108*b* are pinched between an outer wall of the recessed region 144 and the bus bar terminal clamp. The bus bar terminal clamp, when tightened into its recessed region by the four bolts, pinches the battery terminal against the bus bar plate thereby establishing a solid electrical contact with the two battery terminals. Cables (not shown) are connected to the bus bar terminal clamps at either end of the array o bus bar terminal clamps to provide power to an external load.

Note that the end plates 104*a* and 104*b* have a flange 152 on either end with a thicker central region. The thicker central region is the portion that applies pressure to the stack of cells when under the compressive force of springs 106. The width of the manifolds 112*a* and 112*b* is sufficiently narrow so that when the pack is assembled, flanges 152 on the end plates do not contact manifolds 112*a* and 112*b*. There is room available for pressing the two end plates 104*a*, 104*b* toward each other with the aid of springs 106 thereby increasing the pressure that is applied to the stack of cells.

In the described embodiment, end plates 104*a* and 104*b* are made of aluminum, manifolds 112*a* and 112*b*, wedge bus bar plate 110, and the bottom cover are made of ABS (acrylonitrile butadiene styrene) or polypropylene, and the epoxy adhesive: is DP100 Plus from 3M. The coolant could be water or Fluorinert™, which is an electrically insulating coolant sold commercially by 3M. Of course, there are many other commercially available acceptable alternatives to these materials that could be used. In addition, the battery pack assembly can have any number of battery cells depending on the output voltage requirements of the application. Furthermore, clamping mechanisms other than the spring arrangement described herein can be used to accomplish basically the same thing.

In addition, other corrugated structures are possible. The Coroplast is particularly convenient because it commercially available, inexpensive, and has properties that are appropriate for this particular application. However, there are other ways to design and fabricate the corrugated flow plates. Another, though less efficient, approach to making a corrugated plate is to bond a "wavy" sheet of material between two flat sheets of impermeable material. The resulting structure would look more like the corrugated cardboard with which everybody is familiar.

Other embodiments are within the following claims.

What is claimed is:

1. A battery assembly comprising:
   a plurality of battery cells;
   a plurality of corrugated flow plates; and
   an input fluid manifold forming a first manifold chamber and an output fluid manifold forming a second manifold chamber, the input fluid manifold including an input port and the output fluid manifold including an output port,
   wherein each plate of the plurality of corrugated flow plates comprises first and second fluid impermeable sheets connected together by a plurality of ribs located between the first and second sheets, said plurality of ribs forming an array of parallel channels extending from one end of that plate to an opposite end of that plate,
   wherein the plurality of corrugated flow plates and the plurality of battery cells are interleaved with each other, and
   wherein each plate of the plurality of corrugated flow plates extends from the input fluid manifold to the output fluid manifold and is oriented so that the array of parallel channels within that plate forms a plurality of fluid flow paths between and directly connecting the first manifold chamber and the second manifold chamber.

2. The battery assembly of claim 1, wherein the battery cells within the plurality of battery cells are lithium-ion batteries.

3. The battery assembly of claim 1, wherein the battery cells within the plurality of battery cells are flat battery cells.

4. The battery assembly of claim 1, wherein the battery cells within the plurality of battery cells are prismatic battery cells.

5. The battery assembly of claim 1, wherein the interleaved arrangement forms a battery cell stack and further comprising a clamping system applying compressive force to the battery cells within the battery cell stack.

6. The battery assembly of claim 1, wherein the interleaved arrangement forms a battery cell stack and further comprising a clamping system applying compressive force to the battery cells within the battery cell stack.

7. The battery assembly of claim 6, further comprising first and second end plates, the first end plate on one end of the battery cell stack and the second end plate on an opposite end of the battery cell stack.

8. The battery assembly of claim 7, wherein the clamping system comprises a plurality of springs exerting forces on at least one of the first and second end plates.

9. The battery assembly of claim 1, wherein the input fluid manifold has a back wall including a plurality of slots extending into the first manifold chamber and into each of which is inserted a corresponding one of the plurality of flow plates, and wherein the output fluid manifold has a back wall including a plurality of slots extending into the second manifold chamber and into each of which is inserted a corresponding one of the plurality of flow plates.

10. The battery assembly of claim 1, wherein each battery cell among the plurality of battery cells is within direct contact with and between a corresponding two flow plates of the plurality of flow plates.

11. A battery assembly comprising:
a plurality of prismatic battery cells;
an input fluid manifold forming a first manifold chamber and an output fluid manifold forming a second manifold chamber, the input fluid manifold including an input port and the output fluid manifold including an output port; and
a plurality of corrugated flow plates interleaved with the plurality of prismatic battery cells, each of the flow plates extending from the input fluid manifold to the output fluid manifold and providing an array of flow channels between and directly connecting the first manifold chamber and the second manifold chamber and for carrying fluid directly from the first manifold chamber to the second manifold chamber,
wherein each plate of the plurality of corrugated flow plates comprises first and second fluid impermeable sheets and a plurality of parallel ribs located between and connecting the first and second fluid impermeable sheets together, said plurality of parallel ribs forming the array of flow channels.

12. The battery assembly of claim 11, wherein the battery cells within the plurality of battery cells are lithium-ion batteries.

13. The battery assembly of claim 11, wherein each plate of the plurality of corrugated flow plates is an extruded plastic structure.

14. The battery assembly of claim 1, wherein each corrugated flow plate of the plurality of corrugated flow plates is an off-the-shelf, commercially available product.

15. The battery assembly of claim 1 wherein the plurality of corrugated flow plates and the plurality of battery cells are interleaved in an alternating orientation such that adjacent battery cells have a back-to-back, and front-to-front configuration.

16. The battery assembly of claim 11 wherein the plurality of corrugated flow plates and the plurality of battery cells are interleaved in an alternating orientation such that adjacent battery cells have a back-to-back, and front-to-front configuration.

17. The battery assembly of claim 1, wherein each plate of the plurality of corrugated flow plates is an extruded plastic structure.

18. The battery assembly of claim 13, wherein the plastic structure comprises a polypropylene polymer.

* * * * *